United States Patent
Kim

(10) Patent No.: US 8,800,368 B2
(45) Date of Patent: Aug. 12, 2014

(54) SPEED DETECTION SYSTEM OF VEHICLE

(75) Inventor: Yong Jae Kim, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 230 days.

(21) Appl. No.: 13/315,170

(22) Filed: Dec. 8, 2011

(65) Prior Publication Data
US 2013/0014582 A1    Jan. 17, 2013

(30) Foreign Application Priority Data
Jul. 13, 2011    (KR) .......................... 10-2011-0069547

(51) Int. Cl.
*G01P 3/00*    (2006.01)
(52) U.S. Cl.
USPC ........................................................... 73/494
(58) Field of Classification Search
USPC ........................................................... 73/494
See application file for complete search history.

(56) References Cited

U.S. PATENT DOCUMENTS 5,579,225 A * 11/1996 Panicci et al. ...................... 701/1
2010/0272380 A1* 10/2010 Zink et al. ...................... 384/448

FOREIGN PATENT DOCUMENTS

| JP | 8-285878 A | 11/1996 |
| JP | 9-113524 A | 5/1997 |
| JP | 2004-144670 A | 5/2004 |
| KR | 10-0456964 B1 | 11/2004 |

* cited by examiner

*Primary Examiner* — Hezron E Williams
*Assistant Examiner* — Gregory J Redmann
(74) *Attorney, Agent, or Firm* — Morgan, Lewis & Bockius LLP

(57) ABSTRACT

A speed measure system of a vehicle may include a drive shaft that rotates according to movement of a vehicle and a drive gear is formed along the outside thereof; a driven shaft to which a driven gear is formed, wherein the driven gear is engaged with the drive gear; a speed sensor that is disposed on the driven shaft and outputs a rotation signal according to the rotation of the driven shaft; and a jumper connector that is disposed on the speed sensor and transforms the frequency of the rotation signal output from the speed sensor with a predetermined ratio.

5 Claims, 4 Drawing Sheets

FIG.4

| Speed specification | | | Conventional art | This invention |
|---|---|---|---|---|
| Vehicle specification | Tire diameter | | 417 | 417 |
| | REAR AXLE RATIO | | 5.000 | 5.000 |
| | SPEEDO. GEAR SET | DRIVEN / DRIVE | 18T / 6T | 10T / 10T |
| | | RATIO | 3.00 | 1.00 |
| $V_{60}$ | Vehicle speed (Km/h) | | 60.0 | 60.0 |
| $N_T$ | Tire rotation speed | | 382.1 | 382.1 |
| $N_P$ | Rotation speed(drive shaft) | | 1910.6 | 1910.6 |
| $N_{SC}$ | Driven shaft rotation speed | | 637.0 | 1910.6 |
| $N_{pS}$ | Jumper setting ratio | | - | 3.0 |
| $N_{pI}$ | Pulse frequency | | 5096.0 | 5096.0 |
| $V_{indicator}$ | Indicated velocity (Km/h) | | 60.0 | 60.0 |

SPEED DETECTION SYSTEM OF VEHICLE

CROSS-REFERENCE TO RELATED APPLICATION

The present application claims priority to Korean Patent Application No. 10-2011-0069547 filed in the Korean Intellectual Property Office on Jul. 13, 2011, the entire contents of which is incorporated herein for all purposes by this reference.

BACKGROUND OF THE INVENTION

1. Field of the Invention

The present invention relates to a speed measure system of a vehicle that detects rotations of a drive gear that is rotated by a movement of a vehicle and of a driven gear that is gear-meshed with the drive gear and has a speed sensor that transfers the detected rotation to pulse signal.

2. Description of Related Art

Generally, a speed of a vehicle is transferred to a driver through a speedometer or a tacho graph of an instrument panel.

Since this art has been developed to be suited to a vehicle speed signal of 5096 pulse per Kilometer, a driven gear and a gear ratio of a joint or a transmission itself are adjusted to set a vehicle speed ratio according to specifications of a rear axle or a tire of a vehicle.

However, specifications are increased in geometrical progression according to a rear axle ratio and a tire radius of a kind of a vehicle. Further, the number of the gear is used to adjust the gear ratio, and therefore it is hard to achieve an accurate speed ratio thereof.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a speed measure system of a vehicle having advantages of easily adjusting the pulse output to measure the speed of a vehicle regardless of a kind of a vehicle and a gear ratio thereof such that the design cost, the assembly cost, and the maintenance cost are saved.

In an aspect of the present invention, a speed measure system of a vehicle may include a drive shaft that rotates according to movement of a vehicle and a drive gear is formed along the outside thereof, a driven shaft to which a driven gear is formed, wherein the driven gear is engaged with the drive gear, a speed sensor that is disposed on the driven shaft and outputs a rotation signal according to the rotation of the driven shaft, and a jumper connector that is disposed on the speed sensor and transforms the frequency of the rotation signal output from the speed sensor with a predetermined ratio.

The jumper connector may include terminals that are formed corresponding to the predetermined ratio, and a jumper that is disposed on one of the terminals to adjust the predetermined ratios.

A pulse that is outputted from the speed sensor is differently changed according to a terminal that the jumper combines.

The drive gear is a worm gear and the drive gear is a worm wheel gear.

The gear ratio of the drive gear and the driven gear is 1.

A signal transmit portion is formed in the speed sensor to transmit signal to the jumper connector and a signal output portion is formed in the jumper connector to compensate the ratio of the signal to the predetermined ratio.

A screw portion is formed in the jumper connector, which is combined to one side of the speed sensor.

As described above, a jumper of a jumper connector is engaged with a selected terminal such that a pulse signal outputted from a speed sensor through the rotation of a driven shaft is easily changed in a speed measure system of a vehicle according to the present invention. Accordingly, it is unnecessary to change a gear ratio of a driven shaft and a drive shaft according to a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a table showing data in a speed measure system of a vehicle according to an exemplary embodiment of the present invention.

Figure 1:
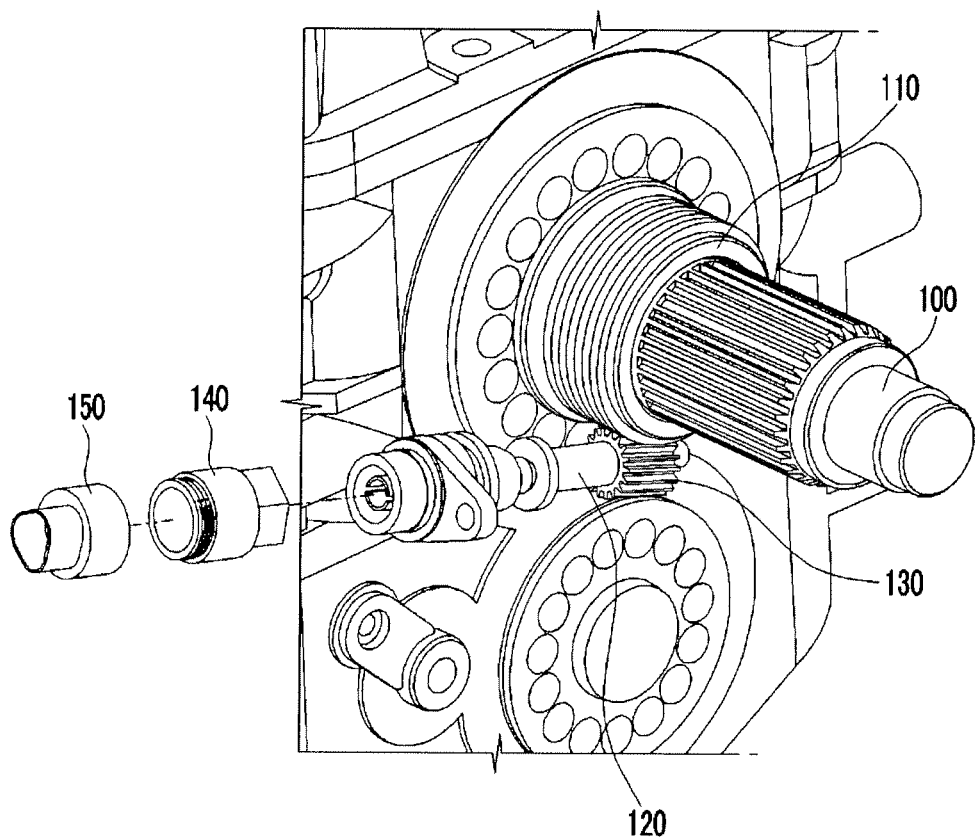
FIG. 1 is a partial exploded perspective view of a speed measure system of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a partial exploded perspective view of a speed measure system of a vehicle according to an exemplary embodiment of the present invention.

Referring to FIG. 1, the speed measure system of a vehicle includes a drive shaft 100, a drive gear 110, a driven gear 130, a driven shaft 120, a speed sensor 140, and a jumper connector 150.

The drive shaft 100 rotates along the movement of the vehicle, which is proportional to the speed thereof, and the drive gear 110 is formed along the exterior circumference thereof. The driven gear 130 is formed along the exterior circumference of end portion of the driven shaft 120 and the driven gear 130 is gear-meshed with the driven gear 110.

The driven gear 130 and the drive gear 110 have a worm and worm wheel gear structure in an exemplary embodiment of the present invention, if the drive shaft 100 rotates one cycle, the driven shaft 120 rotates one cycle such that the gear ratio is 1. Here, the drive gear is worm gear and the driven gear is a worm wheel gear.

While the vehicle moves, the drive shaft 100 rotates the driven shaft 120. The speed sensor 140 generates rotation signals according to the driven shaft 120. The jumper connector 150 transforms the rotation signal generated from the speed sensor 140 to raise or decrease to predetermined ratios.

The rotation signal that is outputted from the jumper connector 150 is transferred to a speedo meter that is disposed in an instrument panel (dash board) of a vehicle.

More particularly, if the drive gear 110 rotates at 1911 rpm, the driven gear 130 rotates at 1911 rpm. Accordingly, the rotation signal of 1911 rpm is input to the speed sensor 140 and 15288 (1911×8) pulse is output through a separate rotation plate (8 pulse).

And, the jumper connector 150 divides the pulse outputted from the speed sensor 140 by 3 to output this. Accordingly, about 5096 pulse is outputted through the jumper connector 150 such that an instrument panel of a driver displays 60 kilometers.

The jumper connector 150 uniformly changes the size of the outputted pulse from the speed sensor 140, which can be applied to a different type of a speed sensor or a different speed system such that the pulse outputted is changed to a predetermined value.

FIG. 1 is a partial exploded perspective view of a speed measure system of a vehicle according to an exemplary embodiment of the present invention.

Figure 2:
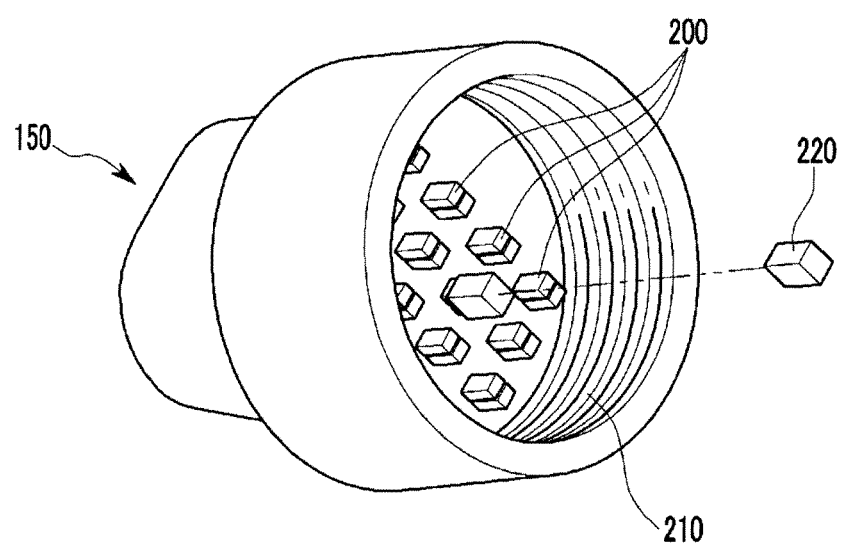
FIG. 2 is a perspective view of a jumper connector that is disposed in a speed measure system of a vehicle according to an exemplary embodiment of the present invention.

Referring to FIG. 2, the jumper connector 150 is a socket type to be engaged with the speed sensor 140 through a thread, and a screw portion 210 is formed along the interior circumference thereof and the terminals 200 are formed on the inner side surface thereof. The jumper 220 is combined to one of the terminals 200.

The pulse that is outputted from the speed sensor 140 is differently changed according to the terminal that the jumper 220 combines. For example, a first terminal of the terminals 200 divides the input pulse from the speed sensor 140 by 2.2 to output the divided pulse.

The second terminal 200 divides the input pulse by 2.4 to output the divided pulse, the third terminal 200 divides the input pulse by 2.6 to output this, the fourth terminal 200 divides the input pulse by 2.8 to output this, the fifth terminal 200 divides the input pulse by 3, and the sixth terminal 200 divides the input pulse by 3.2 to output this. The number of the terminal 200 can be varied according to design specifications of a vehicle.

Accordingly, the operator combines the jumper 220 on a predetermined terminal 200 according to a design specification of a system such that the pulse value outputted from the speed sensor 140 is varied at a regular ratio.

Figure 3:
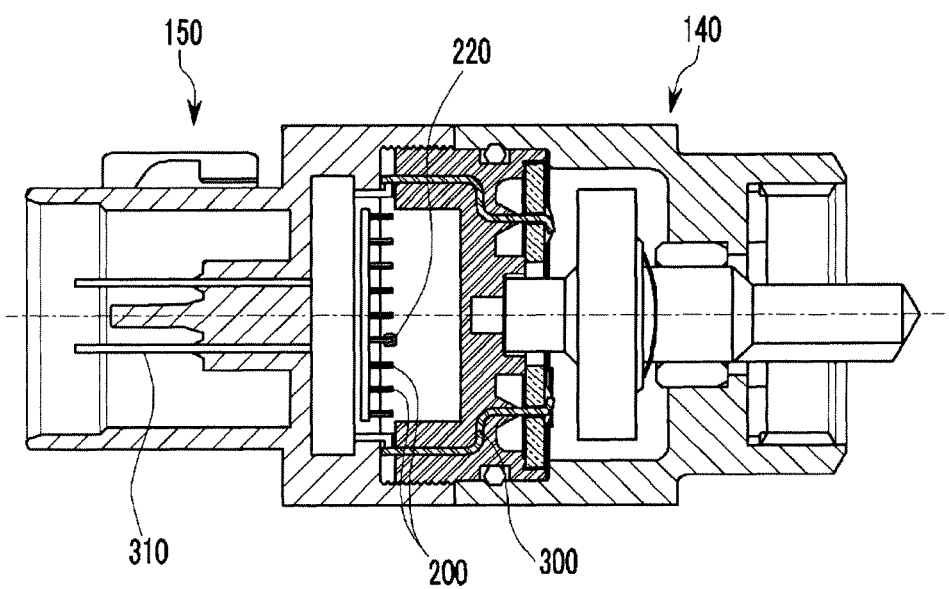
FIG. 3 is a cross-sectional view of a jumper connector and a speed sensor that are disposed in a speed measure system of a vehicle according to an exemplary embodiment of the present invention.

FIG. 3 is a cross-sectional view of a jumper connector and a speed sensor that are disposed in a speed measure system of a vehicle according to an exemplary embodiment of the present invention.

Referring to FIG. 3, the speed sensor 140 is combined with the jumper connector 150 through a thread, a signal transmit portion 300 is formed to transfer the pulse from the speed sensor 140 to the jumper connector 150, and a signal output portion 310 is formed in the jumper connector 150 so as to output the signal.

Further, the terminals 200 are formed in the jumper connector 150 and the jumper 220 is combined with one of the terminals 200. Here, the jumper 220 can be attached or detached.

FIG. 4 is a table showing data in a speed measure system of a vehicle according to an exemplary embodiment of the present invention.

Referring to FIG. 4, a vehicle speed is 60 km/h, a tire rotation speed is 382.1 rpm, a rotation speed (Np) of the drive shaft 100 is 1911, and a rotation speed of the driven shaft 120 (Nsc) is 1911 in an exemplary embodiment of the present invention.

The predetermined ratio of the jumper connector 150 is 3 in an exemplary embodiment of the present invention and the pulse outputted from the jumper connector 150 is 5096 rpm. Here, 1911*8/3=5096.

In the conventional art, it is impossible to change the frequency of the output pulse through the jumper and therefore there was a problem that the gear ratio of the driven shaft 120 and the drive shaft 100 was to be changed.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A speed measure system of a vehicle, comprising:
   a drive shaft that rotates according to movement of a vehicle and a drive gear is formed along the outside thereof;
   a driven shaft to which a driven gear is formed, wherein the driven gear is engaged with the drive gear;
   a speed sensor that is disposed on the driven shaft and outputs a rotation signal according to the rotation of the driven shaft; and
   a jumper connector that is disposed on the speed sensor and transforms the frequency of the rotation signal output from the speed sensor with a predetermined ratio;
   wherein the jumper connector includes a plurality of terminals that are formed corresponding to the predetermined ratio, and a jumper that is disposed on one of the terminals to adjust the predetermined ratios; and wherein a pulse frequency that is outputted from the speed sensor is differently changed according to a terminal that the jumper combines in such a way that the predetermined ratio is changed in accordance with the pulse frequency.

2. The speed measure system of the vehicle of claim 1, wherein the drive gear is a worm gear and the driven gear is a worm wheel gear.

3. The speed measure system of the vehicle of claim 1, wherein the gear ratio of the drive gear and the driven gear is 1.

4. The speed measure system of the vehicle of claim 1, wherein a signal transmit portion is formed in the speed sensor to transmit signal to the jumper connector and an signal output portion is formed in the jumper connector to compensate the ratio of the signal to the predetermined ratio.

5. The speed measure system of the vehicle of claim 4, wherein a screw portion is formed in the jumper connector, which is combined to one side of the speed sensor.

\* \* \* \* \*